April 13, 1954   E. C. PEDERSON   2,675,438
AUXILIARY LIGHTING SYSTEM FOR VEHICLES
Filed March 24, 1952   2 Sheets-Sheet 1

INVENTOR.
Earl C. Pederson
BY
Cook and Schermerhorn
ATTORNEYS

April 13, 1954   E. C. PEDERSON   2,675,438
AUXILIARY LIGHTING SYSTEM FOR VEHICLES
Filed March 24, 1952   2 Sheets-Sheet 2
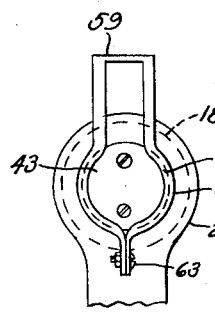
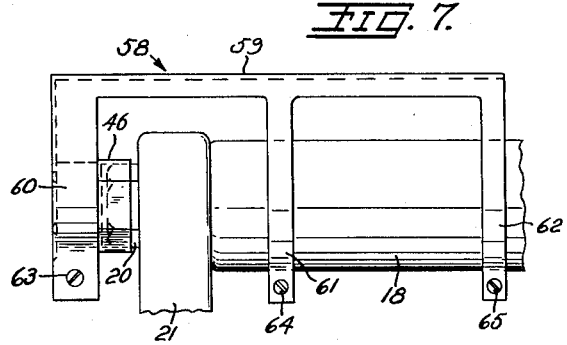
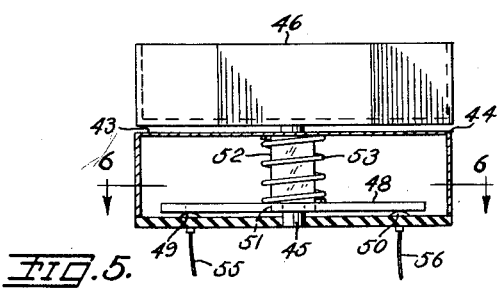
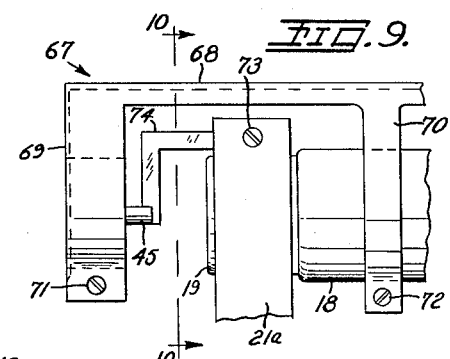
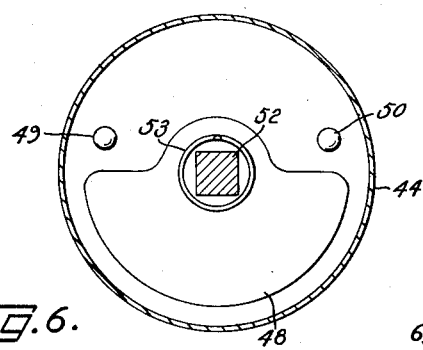
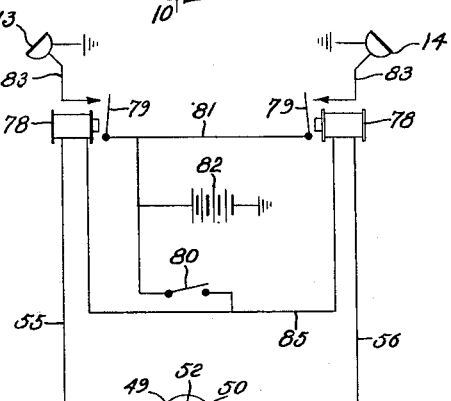
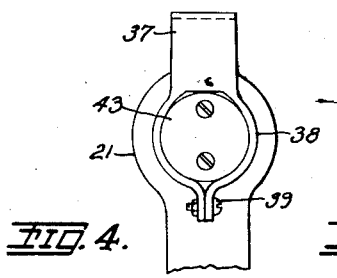
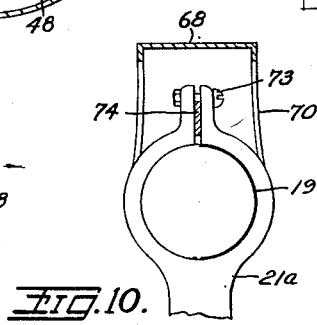
INVENTOR.
Earl C. Pederson
BY
Cook and Schermerhorn
ATTORNEYS Patented Apr. 13, 1954

2,675,438

UNITED STATES PATENT OFFICE 2,675,438

AUXILIARY LIGHTING SYSTEM FOR VEHICLES

Earl C. Pederson, Los Angeles, Calif.

Application March 24, 1952, Serial No. 278,222

6 Claims. (Cl. 200—61.54)

This invention relates to improvements in auxiliary lighting systems for vehicles.

It is an object of the present invention to provide an auxiliary lighting system that is energized upon movement of the steering gear mechanism of a vehicle as the vehicle negotiates a turn, to illuminate the path of the vehicle around the turn.

It is well known that when a vehicle negotiates a turn at night, a portion of the roadway on the inside of the turn is not illuminated by conventional headlights which light the roadway in front of the vehicle. A shadow area is thus produced, making a hazardous driving condition in turning into dark side roads and driveways. Various attempts have been made to provide auxiliary lighting systems to illuminate the shadow area in the direction in which the car is turning, but the devices have not had commercial success because of numerous shortcomings and limitations. An objection to previous lighting systems designed to illuminate the roadway on corners is the complexity and high cost of construction and the difficulties which arise in installing and maintaining them. Another objection is that the actuating mechanisms are connected to the steering column or shaft and are actuated by gears on the steering column which may jam the steering mechanism and cause a serious accident.

A further object of the invention is, therefore, to provide a novel switch mechanism that is easily installed on the steering gear of most types of vehicles without altering said steering mechanism. Further objects are to provide a mechanism that is simple in construction and reliable in operation, and that cannot interfere with the free operation of the steering gear mechanism.

The present invention comprises a lighting system having a pair of angularly directed auxiliary lights at the front corners of the vehicle and a switch which is easily installed as an attachment on the steering gear reduction housing. The switch mechanism comprises a minimum number of parts and can in no way interfere with the operation of the steering gear. The switch is carried by a novel bracket mounted on the outside of the reduction gear housing, and is constructed so as to engage a rotatable member of the steering gear mechanism to actuate one auxiliary light at a time, depending on the direction of turn of the vehicle.

The invention will be better understood and additional objects and advantages will become apparent from the following description taken in connection with the accompanying drawings, which illustrate a preferred form of the device. It is to be understood, however, that the invention may take other forms, and that all such modifications and variations, within the scope of the appended claims, which will occur to persons skilled in the art, are included in the invention.

In the drawings:

Figure 4 is an end view of the bracket of Figure 3 showing the switch mechanism secured in said bracket;

Figure 5 is a central section view of the switch employed with the present invention;

Figure 6 is a section view of the switch taken on the line 6—6 of Figure 5;

Figure 7 is a side elevation view similar to Figure 3 but showing a modified form of bracket for carrying the switch;

Figure 8 is an end view of the bracket of Figure 7;

Figure 9 is a side elevation view of another form of bracket;

Figure 10 is a section view taken on the line 10—10 of Figure 9; and

Figure 11 is a wiring diagram of the electrical system.

Figure 1:
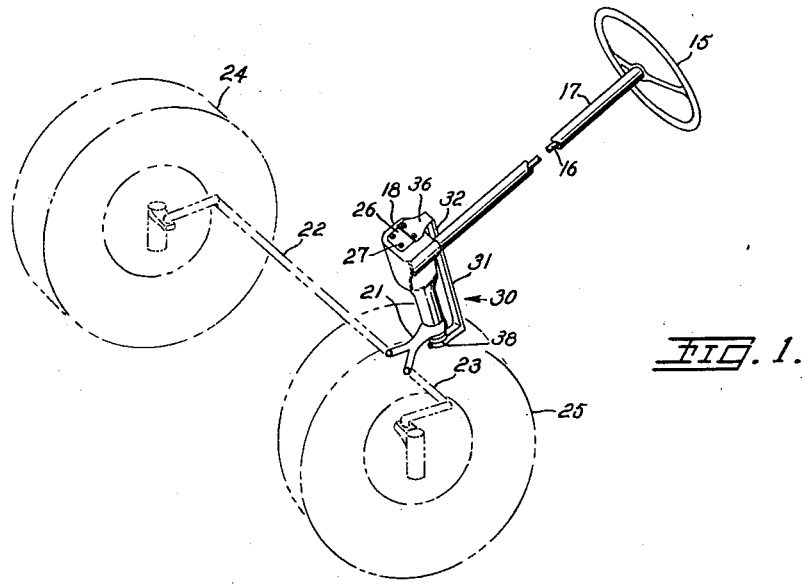
Figure 1 is a perspective view of the steering mechanism of a vehicle showing a preferred form of mounting bracket for the switch of the present invention installed thereon.
Figure 2:
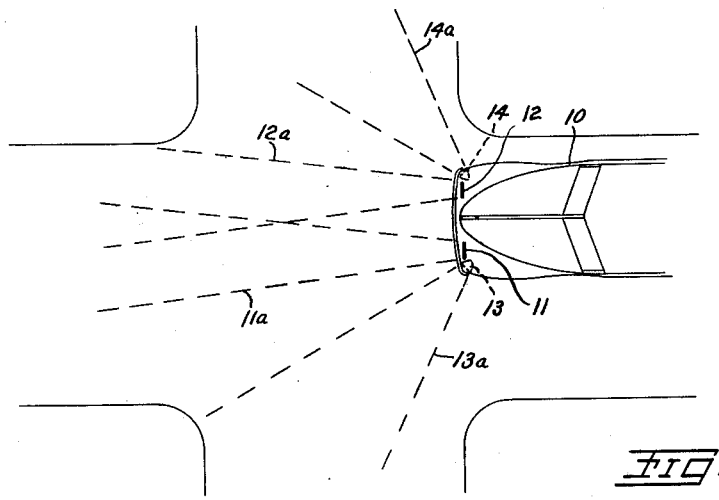
Figure 2 is a plan view of a vehicle having auxiliary lights installed thereon and showing the areas of roadway illuminated by said lights.

Referring first to Figures 1 and 2, a vehicle 10 is equipped with a pair of headlights 11 and 12 to illuminate portions of the roadway designated by numerals 11a and 12a. Mounted at the front corner of each fender, to illuminate shadow area of the roadway into which the vehicle is turning, is a pair of auxiliary lights 13 and 14. The area of roadway 13a and 14a illuminated by the auxiliary lights, respectively, is shown in dotted lines in Figure 2, and it is obvious that the lights may be set to shine at any desired angle, or may be adjustable for such purpose.

Figure 1 shows a conventional vehicle steering mechanism having certain features of the invention applied thereto. A steering wheel 15 is attached to a shaft 16 which passes down inside a stationary tube or housing 17. At the bottom of the shaft 16 is located a steering reduction housing 18, and a worm, not shown, is usually attached to the shaft within the housing and meshes with a roller functioning as a worm gear. The roller is mounted in a forked end of a shaft 19, Figure 3, mounted longitudinally of the gear reduction housing and extending through one end of the housing. The end of shaft 19 is threaded to receive a nut 20. Secured on the extending end of shaft 19 by a nut 20 is a steering gear arm 21 adapted to be connected to a pair of tie rods 22 and 23 to control the turning of the front wheels 24 and 25, respectively. In a common form of construction the housing 18 has a plate 26 on the end opposite the nut 20 and secured by a plurality of cap screws 27. The structure thus far described in Figures 1 and 3 is conventional.

Figure 3:
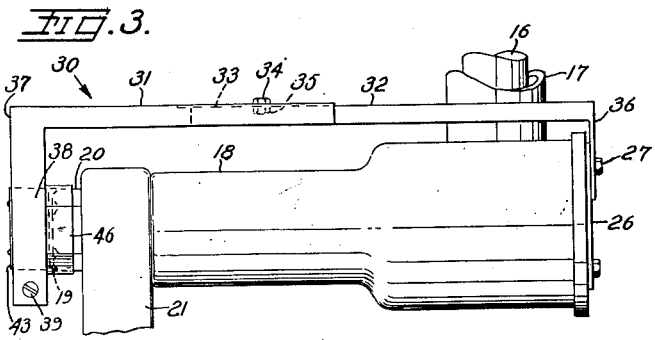
Figure 3 is a side elevation view of the steering gear reduction mechanism showing the mounting arrangement for the switch bracket.

Illustrating a preferred embodiment of the invention, Figures 1 and 3 further show a bracket member 30 comprising a pair of channels 31 and 32. The channel 31 is slightly larger than the channel 32 so that the two channels will telescope to provide an adjustable length for the bracket to fit steering gear reduction housings of different sizes and shapes. The channel member 31 has a slot 33 on its top surface to receive a bolt 34 extending through a hole in the channel member 32 and slidable in the slot 33. A nut 35 on the bolt is tightened to clamp the two channels together in adjusted position on the steering gear reduction housing. The bracket 30 is mounted on one end of the gear housing by providing the channel member 32 with a right angular end plate 36 having holes therein for mounting on the plate 26 of the gear housing and held in place by the screws 27. The channel 31 has a right-angular end portion 37 terminating in a pair of arcuate arms 38 forming a cylindrical socket as best seen in Figure 4. Each of the arms 38 has a hole adjacent its free end to receive a screw 39 to clamp the ends of the arms together.

A switch mechanism 43 having a cylindrical housing 44 is clamped in adjusted position between the arms 38 as shown in Figure 4. Extending through the center of the switch housing 44 and protruding beyond one end thereof is a shaft 45 shown in Figure 5. The protruding end of the shaft carries a cap or connecting member 46 which has a shape to fit snugly over the nut 20, in this instance the cap 46 having a hexagonal shape to fit over the hexagonal nut 20. The cap 46 and shaft 45 are welded or riveted together as an integral unit, and, therefore, turning of shaft 19 in the gear reduction housing will rotate the shaft 45 of the switch. The cap 46 may have deformable or resilient side wall portions to grip nut 20 without lost motion.

The switch 44 is the rotary type wherein a semicircular contact plate 48 of conducting material is adapted to engage one or the other of two contacts 49 and 50, depending on the direction of rotation of the shaft 45. The plate 48 has a square aperture 51 to receive a square portion 52 of the shaft 45 to provide a driving connection between the shaft 45 and plate 48. A compression spring 53 is mounted around the shaft portion 52 and urges the contact plate 48 downwardly to make a good connection with either of the contacts 49 or 50.

Contacts 49 and 50 are insulated from the housing 44 and wires 55 and 56 lead from said contacts, respectively. It is seen that neither of the lights is energized when the switch is in its central position as shown in Figure 6, but that rotation of the plate 48 in one direction will engage one of the contacts 49 or 50 to energize one of the auxiliary lights. The plate 48 is so constructed that it will engage one of the contacts 49 or 50 when it has rotated approximately 5 degrees in either direction, but it is evident that the plate can be constructed so that more or less rotation is required before one of the contacts is engaged. It is desirable that the auxiliary light on the inside of the turn be illuminated as the vehicle begins the turn so that the vehicle can turn in safety, as well as giving warning to pedestrians or other vehicles that a turn in that direction is to be negotiated.

To mount the bracket of Figure 3 on the steering reduction housing, it is necessary merely to remove two of the cap screws 27 from the end of the housing and position the bracket so that apertures in the end plate 26 are aligned with the bores to receive the screws 27. The screws 27 are inserted and tightened. The nut 35 is preferably loose on the bolt 34 so that the channel 31 can be slid into place with the cap 46 fitting over the nut 20. The nut 35 can then be tightened on the bolt to hold the parts in assembled relation.

Figures 7 and 8 show another form of mounting means for the switch which comprises a bracket 58 having a channel shaped body portion 59 and right angular pairs of clamping arms 60, 61 and 62. Each of the pairs of arms is arcuately shaped, the pair of arms 60 gripping the switch housing and the pairs of arms 61 and 62 gripping the steering gear reduction housing 18. Each of the pairs of arms 60—62 are held in gripping position by screws 63, 64 and 65, respectively, extending through apertures adjacent the ends of the arms. The arms 60 have a right-angular flange 66 extending inwardly to positively hold the switch from moving away from the housing 18. This bracket embodiment is made from a single piece of material and is easily inserted on the gear reduction housing by its clamping action of the arms. No length adjustment is necessary because the clamping arms 61 and 62 may be adapted to grip the gear reduction housing in such a position that the cap 46 will fit over the nut 20.

A further form of mounting bracket for the switch is shown in Figures 9 and 10 wherein a bracket 67 has a body portion 68 and pairs of clamping arms 69 and 70, the body portion 68 and arm 69 being channel shaped. Screws 71 and 72 extend through the free ends of arms 69 and 70, respectively, to clamp said arms around the switch and housing 18. This embodiment is intended for use on steering gears where the shaft 19 is not equipped with the previously described nut 20 to secure the steering arm 21. Some automobiles have a steering arm 21a with a split end to clamp around the shaft 19, said split end being held in firm engagement therewith by a clamp screw 73 extending through apertures in the bifurcated portions of the arm. The switch 43 is clamped between the pair of arms 69 and is operated by a lever 74 having one end secured to the shaft 45 of the switch and the other end engaged between the bifurcated end portions of the steering gear arm 21a. Ordinarily there is a slight gap or crevice between the bifurcated end portions of arm 21a wide enough to receive the thickness of lever 74 without loosening screw 73. The lever 74 thus provides a rotative connection between the shaft 19 and the shaft 45 of the switch.

Referring to the wiring diagram of Figure 11, a pair of relays 78, having armatures 79, are connected in a circuit with the leads 55 and 56 from the switch 43. Also connected in the relay circuit is a switch 80 which is mounted on the dashboard so that the auxiliary system can be rendered operative or inoperative by the operator of the vehicle. Switch 80 may comprise or be incorporated in the lighting or ignition switch of the automobile. The lighting circuit comprises a common lead 81 connected between armatures 79 and also connected to battery 82. Each of the lights 11 and 12 has a lead 83 and the armatures 79 are adapted to establish connection between the common lead 81 and the individual leads 83 to supply current to the lights. Switch 80 is connected between the common battery lead 81 and a wire 85 connecting with both relays.

When the auxiliary lighting system of the present invention is in use, the dashboard switch 80 is closed. As the vehicle starts into a turn, the steering gear mechanism rotates the plate 48 of switch 43. In turning the vehicle to the left, plate 48 rotates clockwise and engages the contact 49 and the relay in circuit with lead 55 is energized, actuating its armature and allowing current to flow to the light 11. After the vehicle has negotiated the curve and is ready to assume an approximately straight forward direction of travel, the plate 48 of the switch will be disengaged from the contact 49 and the relay will be deenergized, cutting off the current to the light 11. The light 12 is turned on and off in a similar manner when the vehicle negotiates a curve in the opposite direction, the lights not being energized on slight curves. As stated, it is preferable to construct the switch so that one or other of the lights will be energized when the plate 48 has rotated approximately 5 degrees. The arm 21 or 21a is capable of considerably less than 180° of rotation whereby a 180° arcuate extent of contact plate 48 is sufficient to insure operation of the proper light, regardless of the sharpness of the turn executed by the driver.

By reason of the cylindrical shape of switch housing 43 it is readily rotatable in its mounting bracket, when screw 39 or 63 is loosened, to center the contact plate 48 as shown in Figure 6 when the steering mechanism is centered for straight forward driving.

Having now described my invention and in what manner the same may be used, what I claim as new and desire to protect by Letters Patent is:

1. In a lighting system for a vehicle having a pair of auxiliary head lights directed divergently to illuminate the path of the vehicle in a turn and a steering reduction housing with a protruding steering arm shaft equipped with an end nut; a switch unit for energizing the appropriate one of said lights in a turn, an actuator for said switch unit comprising a cap to fit said nut, and a bracket for mounting said switch unit on said housing with said cap in operative engagement with said nut.

2. In a lighting system for a vehicle having a pair of auxiliary head lights directed divergently to illuminate the path of the vehicle in a turn and a steering reduction housing with a protruding steering arm; a switch unit for controlling said lights, an actuator for said switch unit, and a bracket for mounting said switch unit on said housing with said actuator in operative engagement with the protruding portion of said shaft.

3. In a vehicle lighting system having a switch unit operated by the steering mechanism of a vehicle, a bracket, means on one end of said bracket for securing said bracket to said steering mechanism, and a socket on the other end of said bracket for gripping said switch unit for relative adjustment and holding said switch unit in operative engagement with said steering mechanism for actuation thereby.

4. In a vehicle lighting system having a cylindrical switch unit operated by the steering mechanism of a vehicle, a bracket having means of attachment to said steering mechanism, and a pair of lateral arms on said bracket forming a cylindrical socket for gripping said switch unit in different positions of rotative adjustment and holding said switch unit in operative engagement with said steering mechanism for actuation thereby.

5. In a vehicle lighting system having a switch unit operated by the steering mechanism of a vehicle, an elongated bracket comprising a body member, adjustment means on said body member to vary the length thereof, a plate on said body member for securing said bracket to said steering mechanism, and a pair of curved lateral arms on said body member forming a socket for gripping said switch unit in different adjusted positions and holding said switch unit in operative engagement with said steering mechanism for actuation thereby.

6. In an auxiliary lighting system for a vehicle having right and left auxiliary head lights directed in divergent relation to the main head lights for illuminating the path of the vehicle in a turn, said vehicle including a steering reduction housing with a steering arm having an angular movement less than 180 degrees; a switch unit for energizing the right auxiliary head light in a right turn and the left auxiliary head light in a left turn, a bracket mounted on said housing supporting said switch unit adjacent said steering arm, and an actuating member for said switch unit engaging said steering arm for rotation thereby.

References Cited in the file of this patent
UNITED STATES PATENTS

| Number | Name | Date |
|--------|------|------|
| 1,683,970 | Geyer | Sept. 11, 1928 |
| 2,224,176 | Wiglesworth | Dec. 10, 1940 |

FOREIGN PATENTS

| Number | Country | Date |
|--------|---------|------|
| 26,855 | France | Dec. 6, 1923 |